(12) United States Patent
Malligere (10) Patent No.: US 9,115,689 B2
(45) Date of Patent: Aug. 25, 2015

(54) MECHANICAL WAVE/OSCILLATION TRANSLATOR TO PRODUCE ROTARY SHAFT POWER

(71) Applicant: Girish Jayashankara Aradhya Malligere, Lake Dallas, TX (US)

(72) Inventor: Girish Jayashankara Aradhya Malligere, Lake Dallas, TX (US)

( * ) Notice: Subject to any disclaimer, the term of this patent is extended or adjusted under 35 U.S.C. 154(b) by 0 days.

(21) Appl. No.: 13/998,569

(22) Filed: Nov. 12, 2013

(65) Prior Publication Data

US 2015/0130190 A1    May 14, 2015

(51) Int. Cl.
*F03B 13/10* (2006.01)
*F03B 13/22* (2006.01)

(52) U.S. Cl.
CPC ...................... *F03B 13/22* (2013.01)

(58) Field of Classification Search
CPC ...... F03B 17/06; F03B 13/16; F03B 13/1805; F03B 13/182; F03B 13/181; F03B 13/186; F03B 13/262; F03B 13/264; F03B 13/1815; F03B 13/1845; F03B 13/1855; F03B 13/187; F03B 13/189; F03B 13/1885
USPC .................. 290/53, 54, 43; 415/3.1
See application file for complete search history.

(56) References Cited

U.S. PATENT DOCUMENTS

| | | | | |
|---|---|---|---|---|
| 597,118 | A * | 1/1898 | Lotzgesell | 416/6 |
| 1,045,654 | A * | 11/1912 | Willy | 417/330 |
| 1,528,165 | A * | 3/1925 | Pasquariello | 60/498 |
| 1,925,742 | A * | 9/1933 | Bamber et al. | 60/505 |
| 4,077,213 | A * | 3/1978 | Hagen | 60/500 |
| 4,539,484 | A * | 9/1985 | Suggs | 290/53 |
| 6,247,308 | B1 * | 6/2001 | Solell | 60/495 |
| 8,884,457 | B1 * | 11/2014 | Jones | 290/54 |
| 2006/0208494 | A1 * | 9/2006 | Cook | 290/53 |
| 2010/0225116 | A1 * | 9/2010 | Cuong | 290/53 |
| 2013/0069369 | A1 * | 3/2013 | Salehpoor | 290/53 |
| 2013/0234440 | A1 * | 9/2013 | Peng | 290/53 |
| 2014/0091575 | A1 * | 4/2014 | McCormick et al. | 290/53 |

* cited by examiner

*Primary Examiner* — Julio C. Gonzalez
(74) *Attorney, Agent, or Firm* — David G. Moore (57) ABSTRACT

Transverse and longitudinal wave energy is transformed into useful mechanical energy. The basic unit is composed of a linkage body with a socket located at each end. A main bevel gear inserted into each socket engages with a bevel gear attached to a transverse power shaft. A one way clutch permits the bevel gear to move in one direction. A number of these units can be connected end on end to magnify the mechanical energy transformed from wave energy. The terminus of the transverse power shaft is connected to the rotor of an electrical generator. As the linkage bodies interact with the force of the waves, the transverse power shaft is rotated which then causes the rotor of the electric generator to spin creating electricity.

4 Claims, 7 Drawing Sheets

MECHANICAL WAVE/OSCILLATION TRANSLATOR TO PRODUCE ROTARY SHAFT POWER

CROSS-REFERENCE TO RELATED APPLICATIONS

The current application claims the benefit and priority to U.S. Provisional Application No. 61/867,851 filed on Aug. 20, 2013 which is incorporated herein by reference as if fully set forth.

STATEMENT REGARDING FEDERALLY SPONSORED RESEARCH OR DEVELOPMENT

No part of the invention disclosed herein was the subject of federally sponsored research or development.

THE NAMES OF THE PARTIES TO A JOINT RESEARCH AGREEMENT

None

REFERENCE TO A SEQUENCE LISTING

Not applicable.

BACKGROUND OF THE INVENTION

1. Field of the Invention

This invention relates to a means for translating wave energy into a useable form of energy such as electricity.

2. Description of the Prior Art

Waves of water, wind or other sources have long been known to contain large amounts of energy which can be translated into useable energy such as electricity. Methods to capture the energy of waves are can be grouped into those methods located onshore and those methods located offshore. Onshore wave power methods capture the energy of breaking waves. One onshore method of capturing wave power consists of a tapered channel system which empties into a reservoir located on land high above sea level. The narrowing of the channel causes the waves to increase in height as they move toward the land. The waves top the walls of the channel and fill the reservoir. The water in the reservoir is then used to power a turbine.

Another onshore method of capturing wave power consists of a rectangular box that is open to the sea at one end. A flap is hinged over the open and the action of the waves causes the flap to swing back and forth like a pendulum. This swinging motion powers a hydraulic pump and generator.

Offshore methods for harnessing the energy of waves are usually located in deep water and connected to a land station by pipes and cables. One offshore method employs a buoy tethered to the sea floor. As the sea rises and falls the buoy rises and falls in concert with the water. The motion of the buoy may power a pump which compresses water. The pressurized water travels to the land station where it is used to power a turbine.

Another offshore method for harnessing wave energy consists of a buoyant, hinged flap attached to the seabed near shore. The movement of the flap in response to the action of the waves drives hydraulic pumps which push high pressure water through a submerged pipe to drive a hydro-electric turbine.

Wave energy can also be captured through the use of long cylindrical floating tubes connect to each other with hinges and anchored to the sea floor. They cylindrical parts move in concert with the ocean and drive hydraulic rams which in turn, drive an electric generator.

Most of these methods for capturing the wave energy use the wave energy to drive hydraulic pumps or rams. The efficiency of these methods suffers from fluid friction and pressure drop. Moreover, the hydraulic mechanisms driven by the offshore methods for capturing wave energy are subject to mechanical breakdown which may be difficult to repair since these devices are usually located below the surface of the sea. In addition, these methods used to capture the wave energy are usually located a distance away from the power take-off system such as a turbine. This distance results in further loss of energy and overall loss of efficiency.

What is needed in the art is a system and method for translating wave energy into a usable form of energy which has fewer components, less bulky, reliable and converts rotary shaft power into usable energy at the source of wave energy.

BRIEF SUMMARY OF THE PRESENT INVENTION

The invention disclosed herein is a system and method for translating wave energy into a usable form of energy which has fewer components, less bulky, reliable and coverts rotary shaft power into usable energy at the source of wave energy. Specifically, the wave energy translator disclosed herein consists of a series of linkage bodies connected to each other end-on end by a universal joint attached to beveled gears which rotate a transverse output shaft. As the linkage bodies encounter a wave or oscillation, the transverse output shaft is rotated along the length of the linkage bodies. The rotating transverse output shaft is attached directly to a power take-off such as an electrical generator, pump, compressor or any dependent mechanical system requiring shaft power. The wave energy is then translated into usable electricity.

BRIEF DESCRIPTION OF THE DRAWING/FIGURES

A better understanding of the invention disclosed herein may be had by examination of the following drawing/figures.

DETAILED DESCRIPTION OF THE INVENTION

Figure 1:
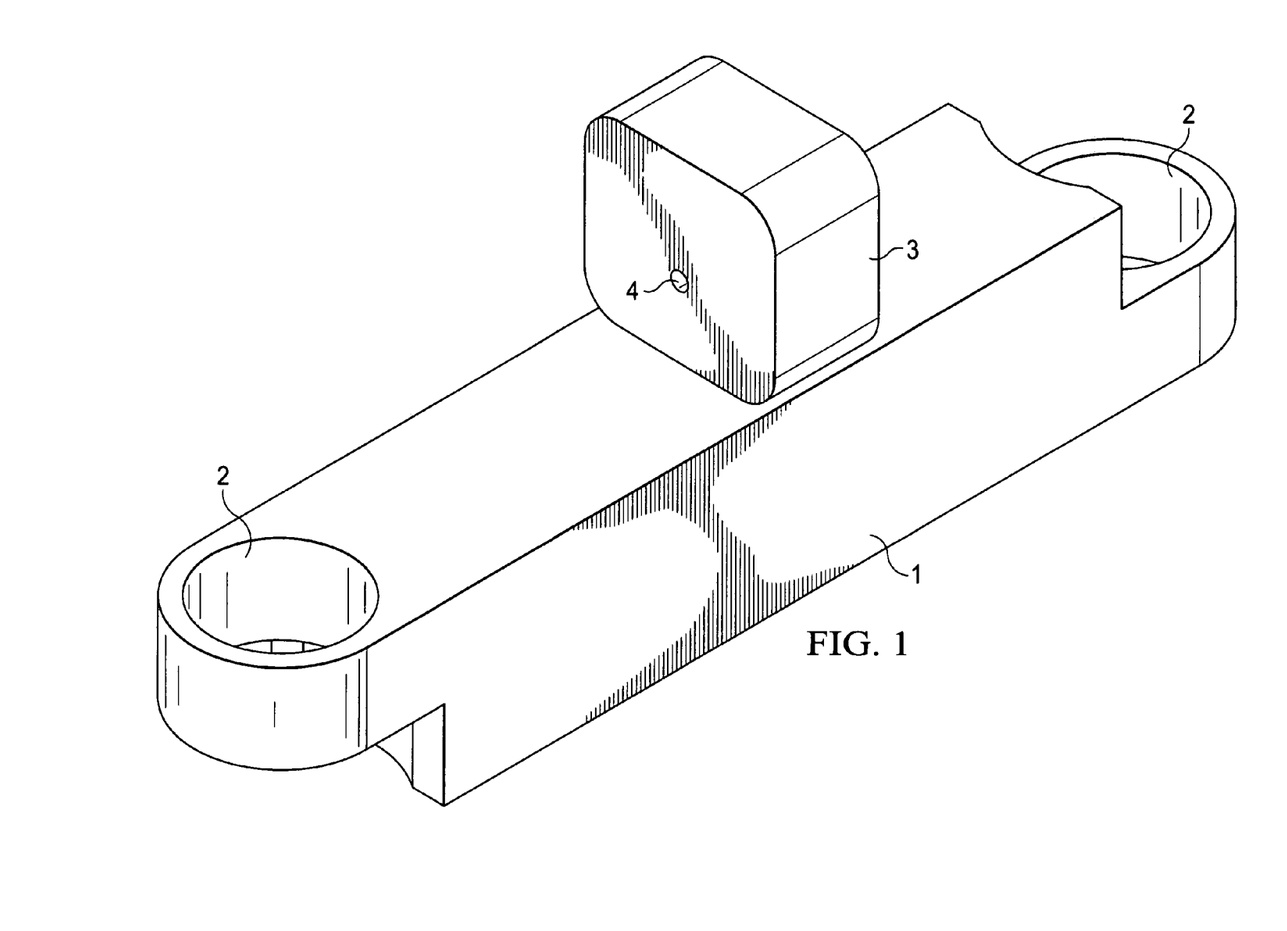
FIG. 1 is a view of the linkage body and attached bearing block.

The mechanical wave/oscillation energy translator disclosed herein is composed to two principal components. One component shown in FIG. 1 is a linkage body 1 which is approximately rectangular in shape with rounded ends. At each end of the linkage body 1 are situated sockets 2 to allow the installation of one way clutches at each end of the linkage body 1. At one end of the linkage body 1, the top half of the linkage body 1 at the socket 2 is removed. At the opposite end of the linkage body 1, the bottom half of the linkage body at the socket. is removed. Securely attached to the linkage body 1 is a bearing block 3 which incorporates a tunnel containing a ring of bearings 4 which extends completely thru the bearing block 3.

Figure 2:
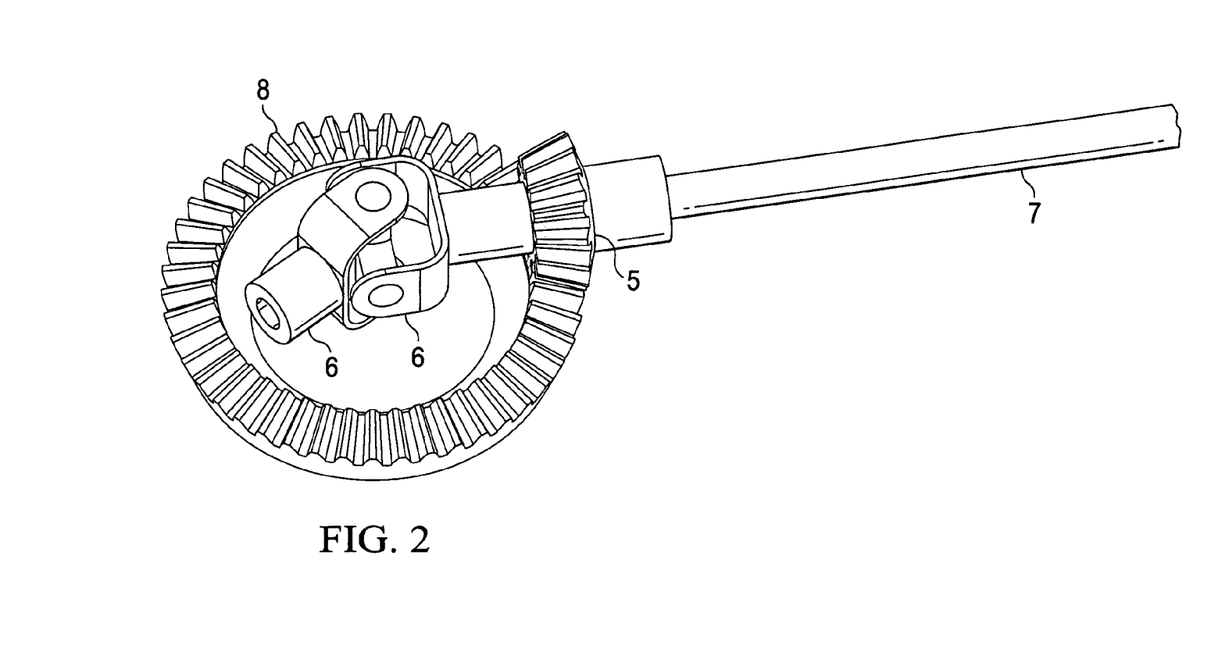
FIG. 2 is a view of the bevel gear with universal joint and transverse shaft.

The second principal component of the mechanical wave/oscillation energy translator disclosed herein is shown in fig. and consists of a bevel gear 5, universal joint 6, a transverse output shaft 7 and main bevel gear 8 as shown in FIG. 2. The bevel gear 5 engages the main bevel gear 8. The main bevel gear 8 is attached to a one way clutch (not shown) embedded in the sockets 2 of the linkage body 1. The bevel gear 5 is connected to a universal joint 6 which may be connected to another bevel gear 5 connected to a second linkage body 1. The bevel gear 5 is securely connected to the transverse output shaft 7.

Figure 3:
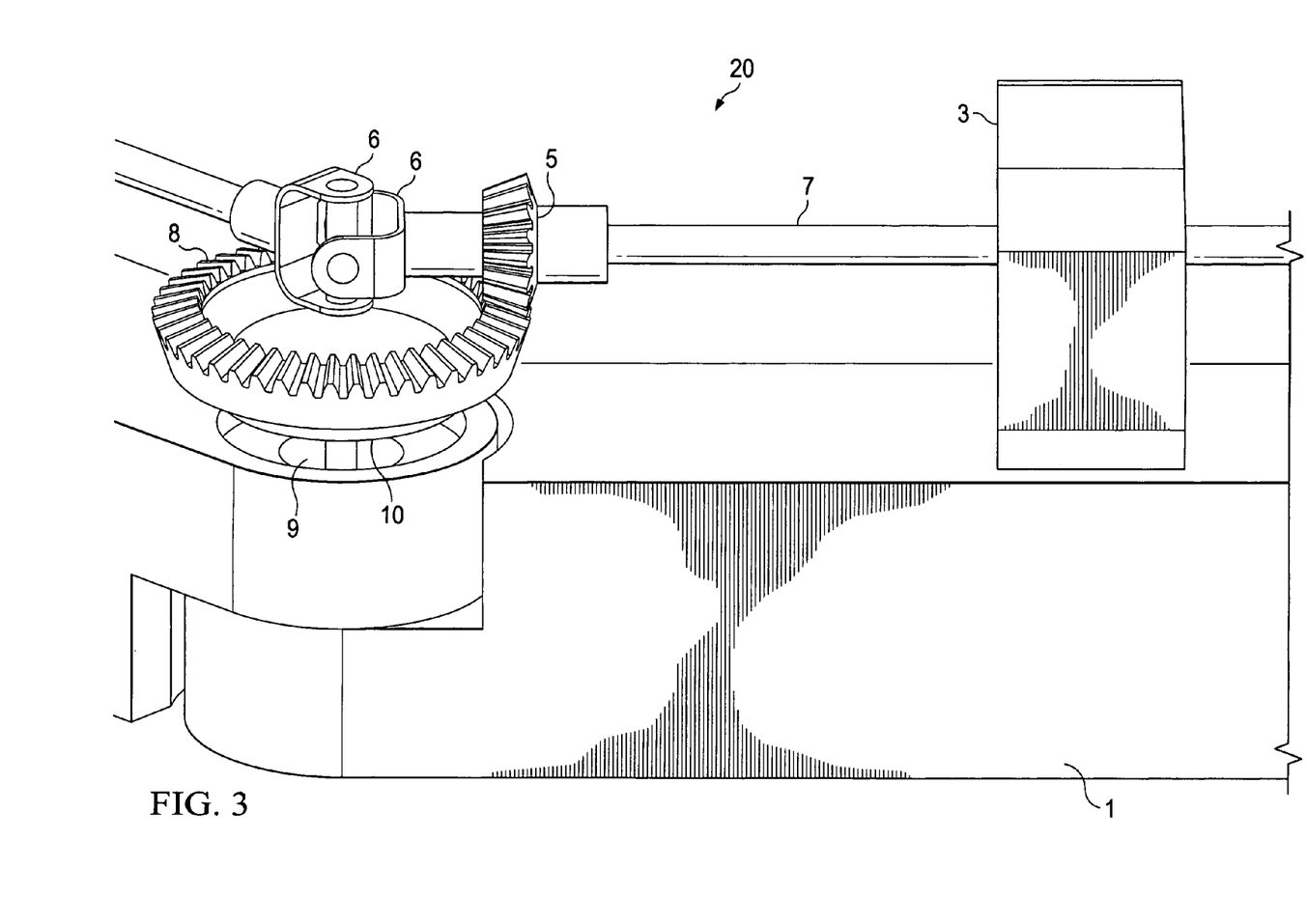
FIG. 3 is a view of the assembled linkage body, bevel gear and transverse shaft.

Assembly of the mechanical wave/oscillation energy translator is shown in FIG. 3. The one way clutch 9 is inserted into the socket 2 of the linkage body 1. The main bevel gear 8 is attached to the one way clutch 9 by a clutch shaft 10. The transverse output shaft 7 extends parallel to the linkage body 1 and is inserted through the tunnel 4 in the bearing block 3 and is supported by the bearings (not shown) in the bearing block 3. The end of the transverse output shaft 7 attached to the bevel gear 5 is aligned on the main bevel gear 8 so as to permit the bevel gear 5 and the main bevel gear 8 to engage. In one embodiment of the mechanical wave/oscillation energy translator disclosed herein, a plurality of linkage bodies 1 can be connected together in an end-on-end fashion. Multiple linkage bodies 2 can be connected by matching the corresponding upper socket 2 with the complementary lower socket 2 on the adjacent linkage body 1 assembled as described above. The bevel gears 5 are connected by a universal joint 6 in a configuration in which the bevel gears 5 from adjacent linkage bodies 1 are engaged with the main bevel gear 8.

Figure 4:
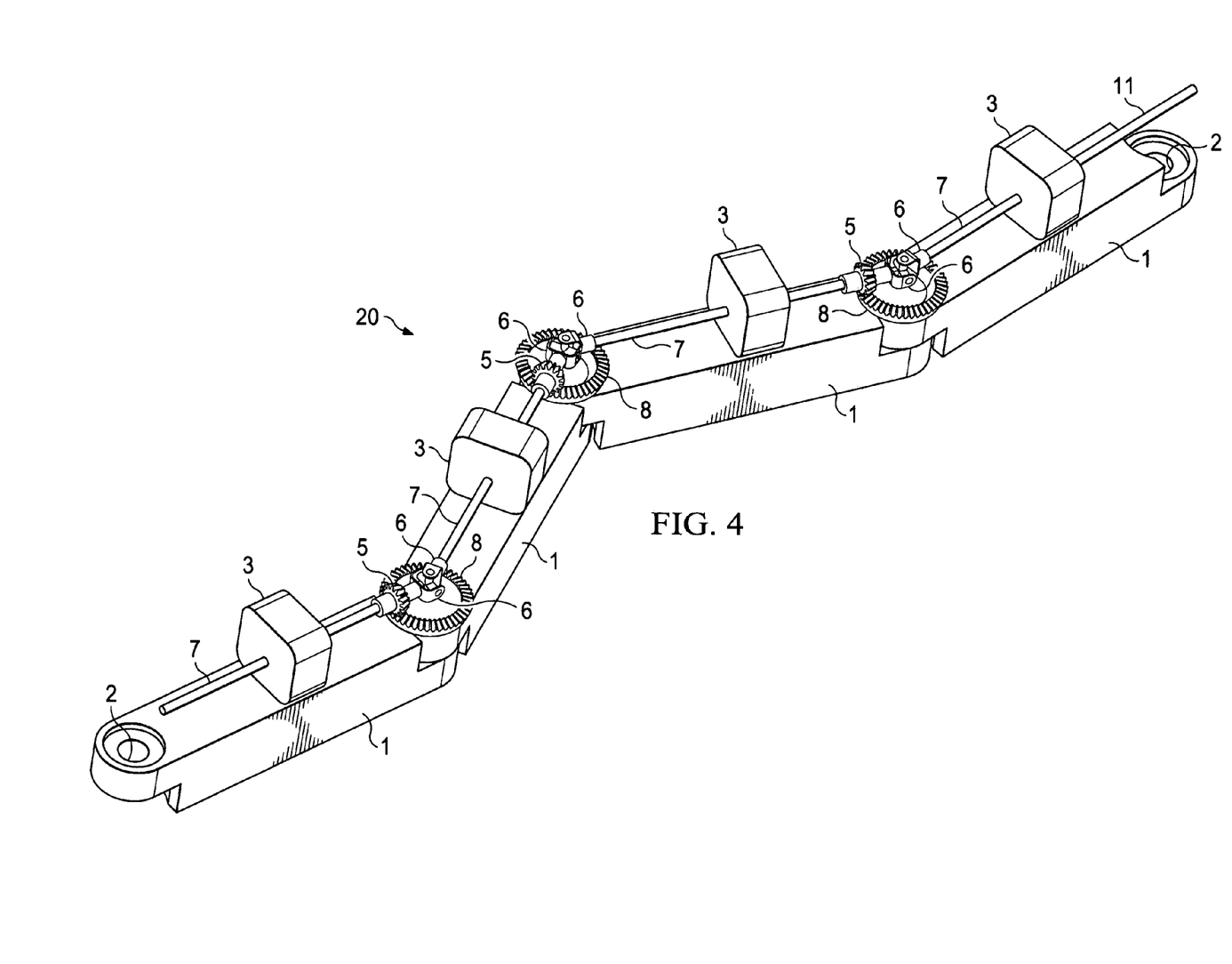
FIG. 4 is a view of four assembled linkage body.
Figure 5:
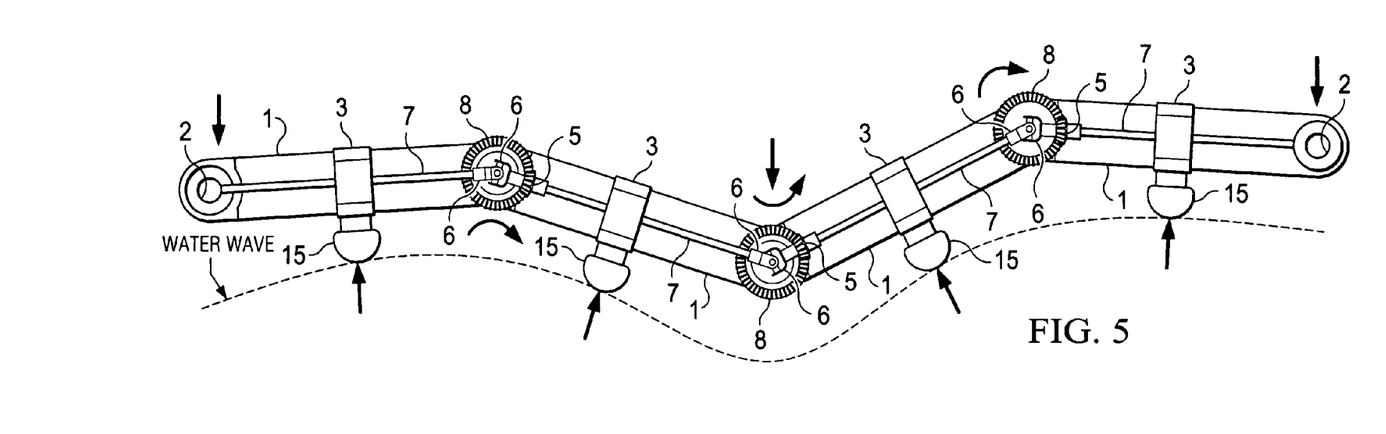
FIG. 5 is a view of four linkages assembled.
Figure 6:
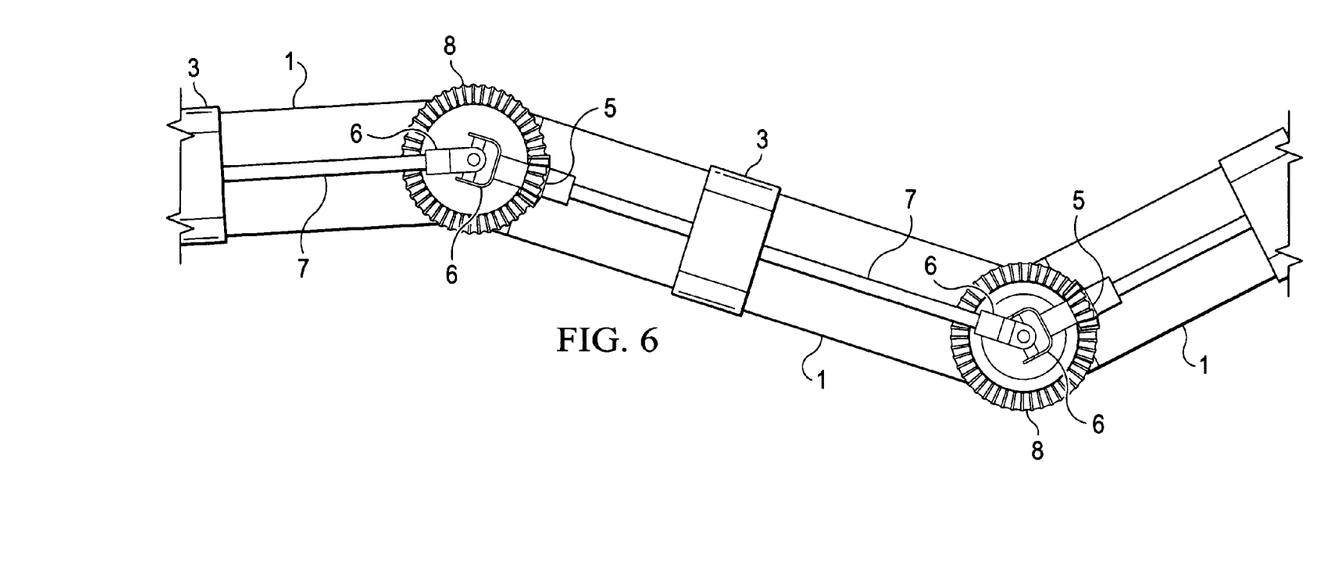
FIG. 6 is a view of the rotation of the linkages caused by longitudinal or transverse wave oscillation.

A full assembly the mechanical wave/oscillation energy translator consisting of four linkage bodies 1 is shown in FIGS. 4 and 5. Each assembled linkage body 1 is attached to the adjacent linkage body 1 by a universal joint 6 so that the bevel gear 5 of each linkage body 1 is engaged with the main bevel gear 8. The transverse power shaft 7 is supported by the bearing block 3 attached to each linkage body 1. The transverse output shaft 7 at the end 11 of the chain of linkage blocks may then be attached to a power generator. The universal joint 6 coupling each linkage body 1 allows the transverse output shaft 7 to bend at each linkage and still transfer the shaft power to a power generator. The Mechanical Wave/Oscillation Translator is shown in the FIGS. 4 and 5 in a horizontal plane supported by floats 15 for clarity and illustrative purposes only. In actual use the orientation of the device will be vertical (i.e. perpendicular to the plane of the water surface). The linkage bodies 1 act in opposing fashion to produce shaft rotations due to the ebb and flow wave action resulting from buoyancy and the dead weight of the device keeping the device in the vertical orientation. As a result, the overall shape of the device is that of a repeating sinusoidal wave causing the bearing block links to act opposite at each joint producing shaft power in phases. Each linkage body 1 has a one way clutch attached to each bearing block arm which are arranged so that each one way clutch is oriented to rotate in the opposite direction to the one way clutch positioned at the adjacent linkage body 1.

The mechanical wave/oscillation energy translator converts wave energy into rotary shaft energy which may then be used to power and electrical generator. The linkage bodies 1 move up and down in both transverse and longitudinal waves in water. The relational movement between the linkage bodies 1 are recognized as partial rotation by the one way clutch 9 which engage in one direction moving up and the other linkage body 1 moving in a down direction relative to the adjacent linkage body 1 driving the transverse output shaft 7 in a continuous phase. The movement of the linkage bodies 1 is transferred to the transverse output shaft 7 through the bevel gear 5/main bevel gear 8 arrangement.

The rotary shaft power is transferred to the transverse output shaft 7 on the adjacent linkage body 1. The amount of shaft power generated increases with the number of linkage bodies 1 connected together.

Figure 7:
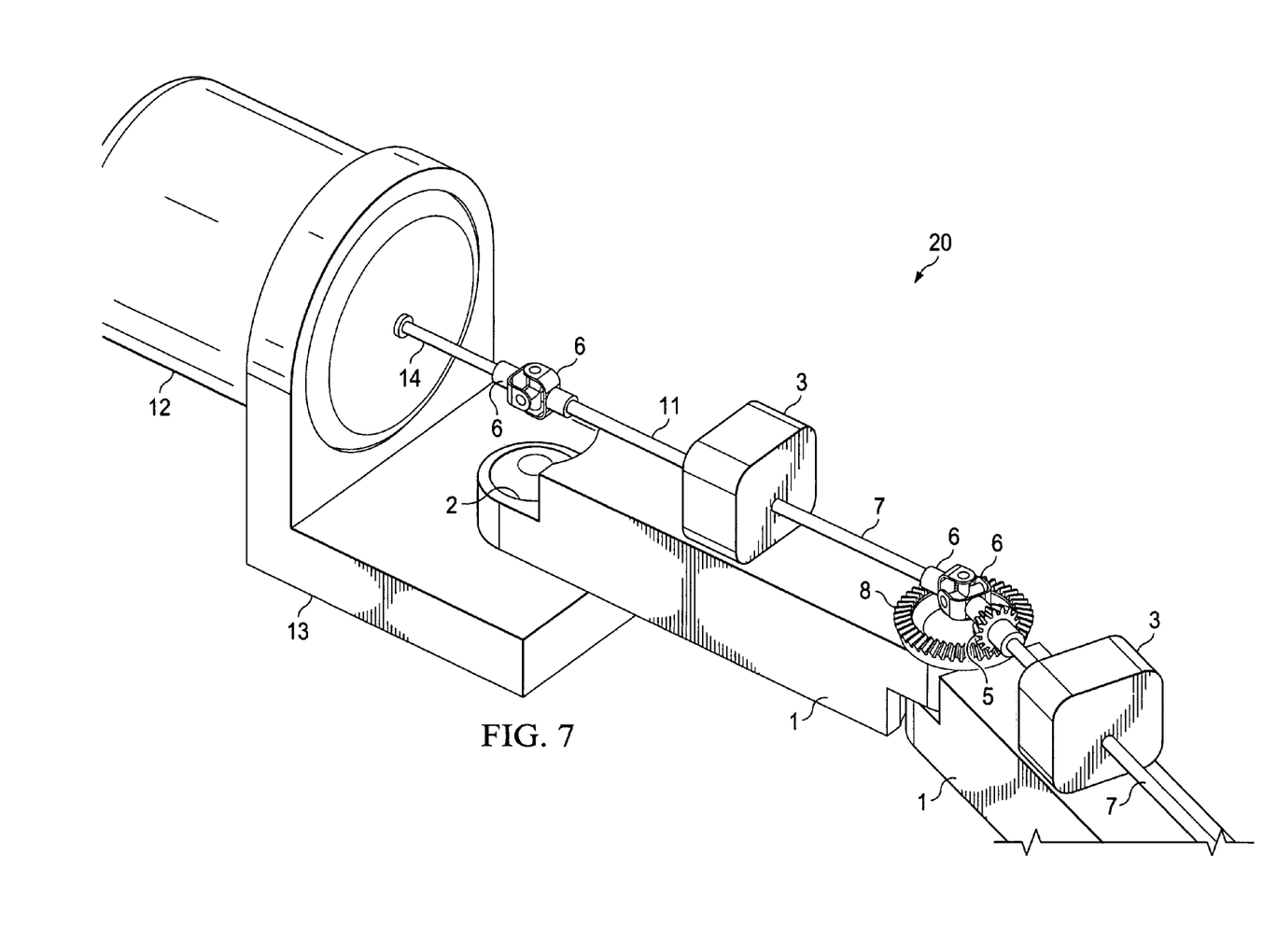
FIG. 7 is a view of the wave translator coupled to an electric generator.
Figure 8:
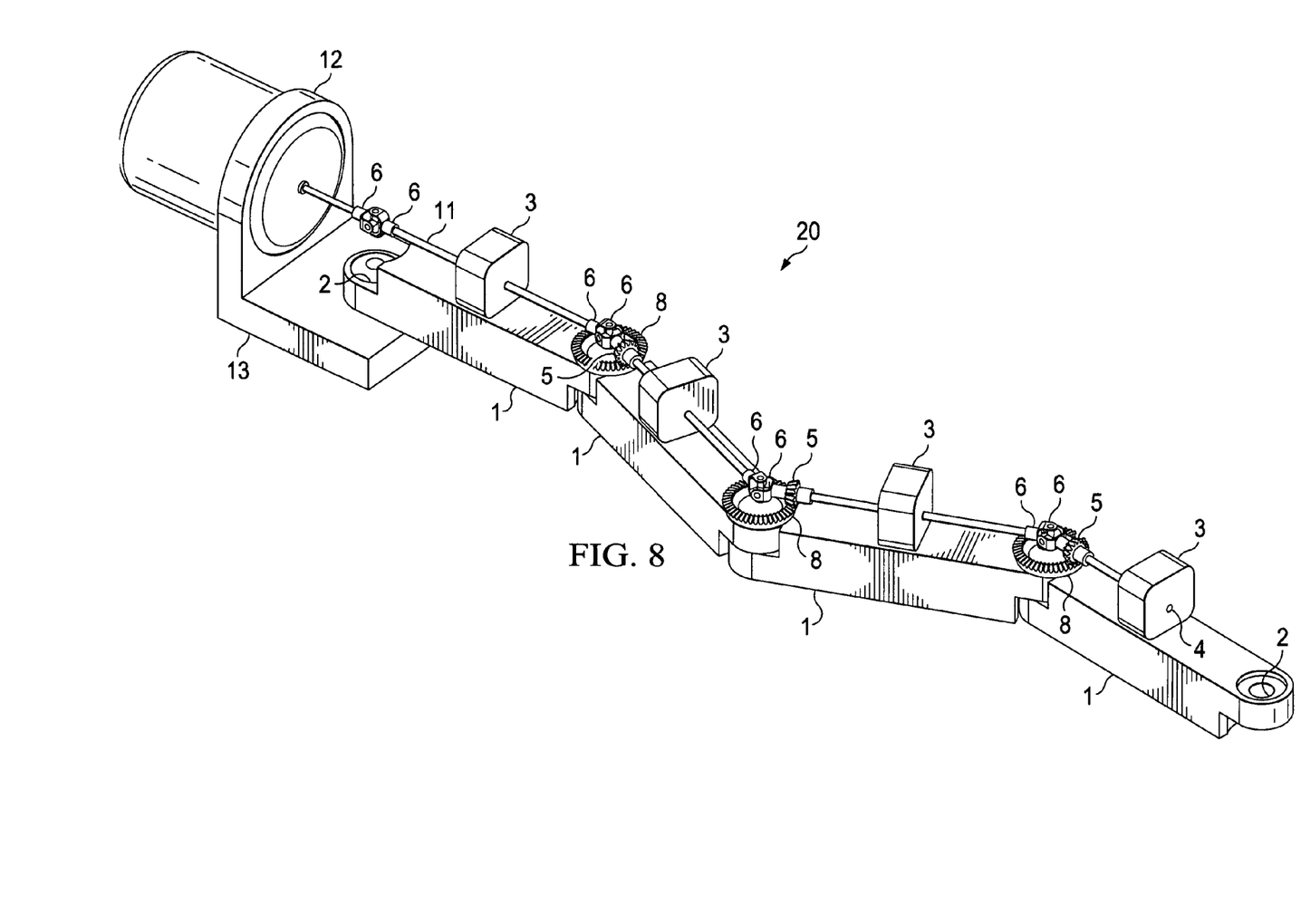
FIG. 8 is a view of the wave translator coupled to an electric generator.

In order to generate usable power, the shaft power contained in the transverse output shaft 7 generated in response to the motion of the linkage bodies 2 must be transferred to a power generator such as an electric generator. As shown in FIGS. 7 and 8, the transverse output shaft end 11 may be connected to an electrical generator 12 by a universal joint 6. The electrical generator 12 may be attached to a generator base mount/housing 13. The transverse output shaft end 11 located on a terminal linkage body 1 is connected to the rotor 14 of the electrical generator 12. As the transverse output shaft 7 of the connected linkage bodies 1 rotates in response to the longitudinal and transverse movement of the linkage bodies 2 generated by the interaction of the linkage bodies with a wave, the transverse output shaft end 11 turns the rotor 14 of the electrical generator 12 and electricity is generated. Thus, wave energy is translated into usable electrical power by the mechanical wave/oscillation energy translator.

The mechanical wave/oscillation energy translator disclosed herein is susceptible of being constructed and configured of different sizes and for a variety of applications. In one embodiment, the universal joint may be replaced with a ball joint to increase flexibility of movement of the chain of linkage bodies. The wave/oscillation energy translator can capture energy from a variety of wave sources such as waves created by wind. The invention disclosed herein may also be used to recharge batteries in handheld devices such as cell phones and notebook computers. The wave energy could be provided by a user moving one or more linkage bodies in an up and down fashion. A version of the invention disclosed herein could also be used in automatic transmissions of a vehicle using the varying amplitude and actuation frequency as a means of varying speed and torque. A miniaturized version of the invention disclosed herein could be used for medical purposes such as powering cardiac pacemakers, delivering medicine. Such use could receive the rotational shaft power from blood flow, heart beat or muscle contraction. All of these other embodiments are included within the specification as if specifically described and as covered by the appended claims.

I claim:

1. A mechanical apparatus for translating wave/oscillation energy into usable rotary shaft energy to power a device comprising:
    a plurality of linkage bodies configured with a socket at each end of said linkage body;
    a bearing block with a passage extending through said bearing block and said bearing block is attached to said linkage body;
    a bevel gear attached to a transverse output shaft which said transverse output shaft extends through said passage in said bearing block;
    a main bevel gear attached to a one way clutch positioned in said socket and to which engages said bevel gear;
    whereby movement of said linkage body generated by a transverse and/or longitudinal wave produces rotation in said transverse output shaft which can be used to power said device dependent on rotary shaft power.

2. The mechanical apparatus for translating wave/oscillation energy defined in claim 1 wherein said device is an electrical generator.

3. The mechanical apparatus for translating wave/oscillation energy defined in claim 1 wherein said device is a pump.

4. The mechanical apparatus for translating wave/oscillation energy defined in claim 1 wherein said device is a compressor.

* * * * *